Jan. 4, 1949.   H. W. CLEVELAND   2,458,348
ELECTRIC RESISTANCE FILM HYGROMETER
Filed May 6, 1944   2 Sheets-Sheet 2
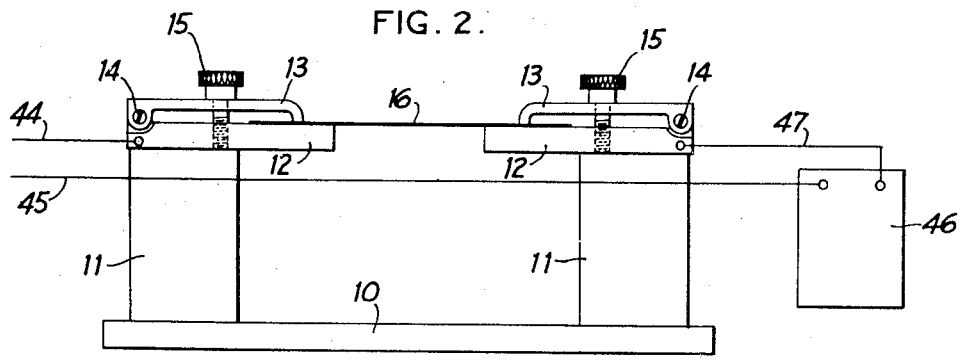
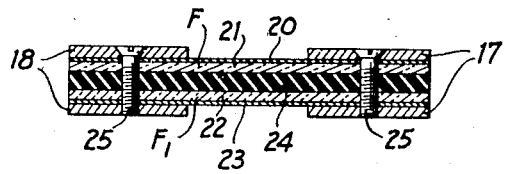
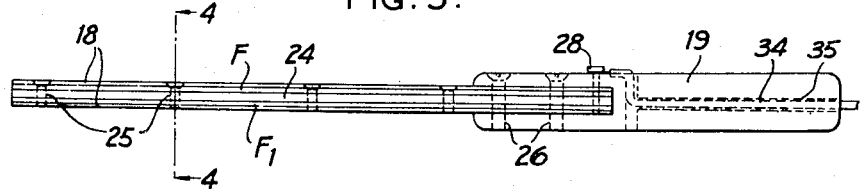
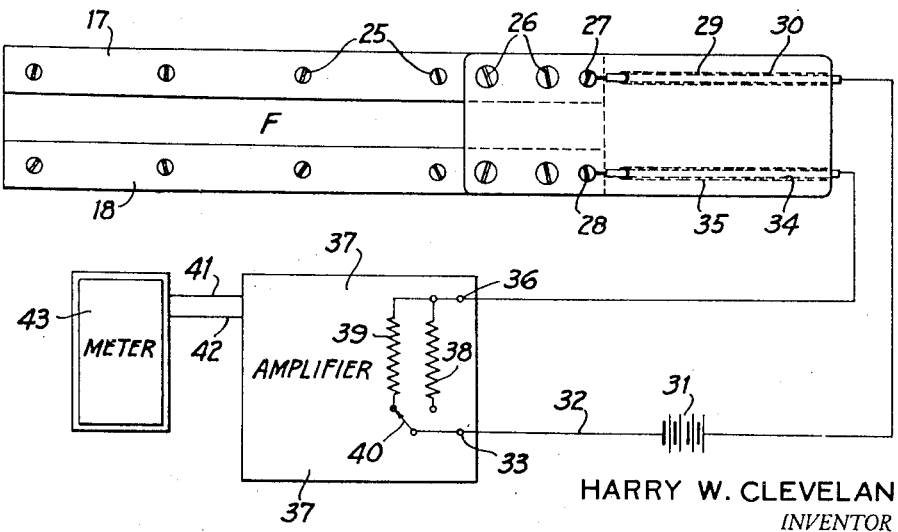
HARRY W. CLEVELAND
INVENTOR
BY
ATTORNEYS Patented Jan. 4, 1949

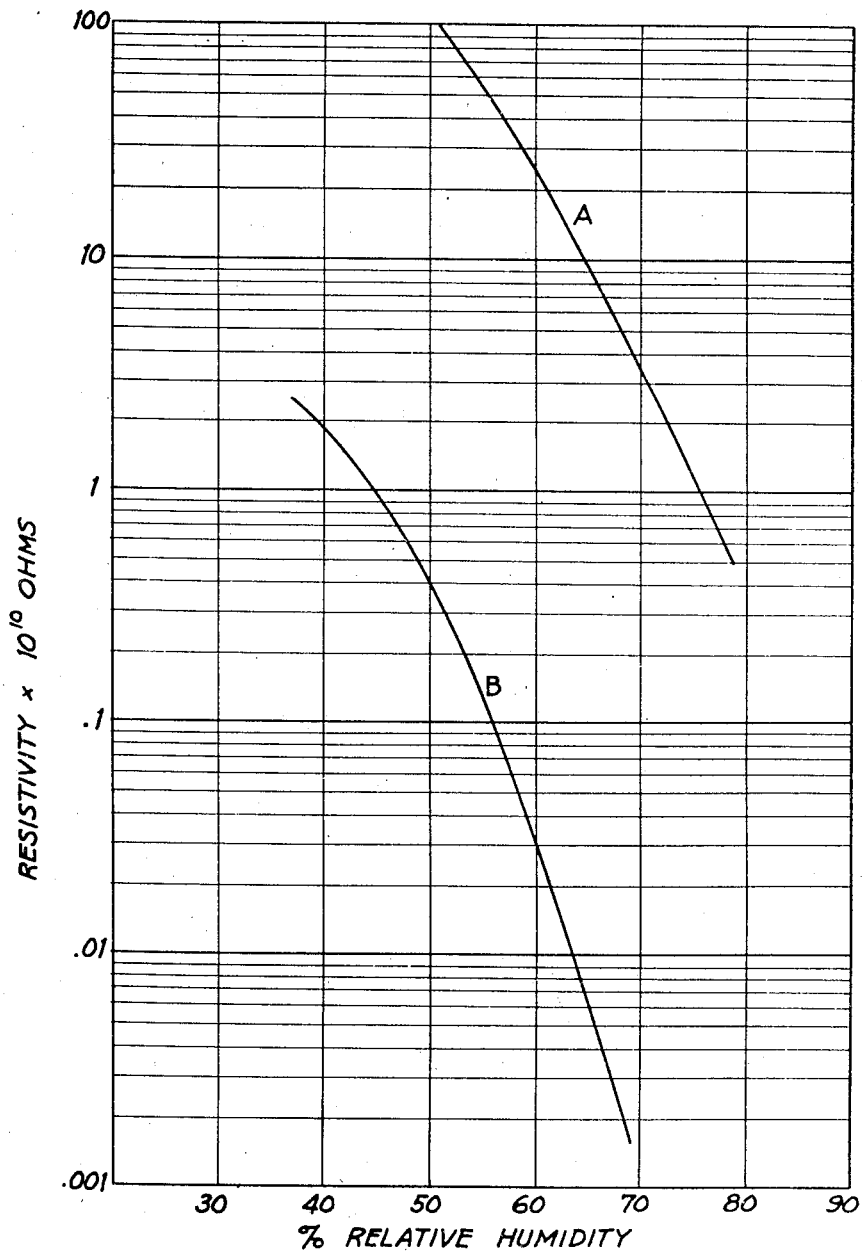

2,458,348

UNITED STATES PATENT OFFICE 2,458,348

ELECTRIC RESISTANCE FILM HYGROMETER

Harry W. Cleveland, Rochester, N. Y., assignor to Eastman Kodak Company, Rochester, N. Y., a corporation of New Jersey Application May 6, 1944, Serial No. 534,416

10 Claims. (Cl. 201—63)

The present invention relates to a hygrometer for measuring absolute or relative humidities of an atmosphere and more particularly to a hygrometer in which the electrical conductivity of a hygroscopic element varies with change in humidity.

It is known that humidity determinations can be made by measuring some electrical characteristic, such as the resistance or conductivity or capacitance of a hygroscopic member or element. However, the known hygrometers have one or more shortcomings in that they have low sensitivity, slow response, have large temperature effects necessitating several calibrations for different temperature levels, are not readily reproducible with any great degree of uniformity, may of themselves introduce change in humidity of the atmosphere, and/or are physically weak and susceptible to damage during practical usage. Also, certain of the prior art electrical hygrometers have a large hysteresis effect to complicate or affect the procurement of accurate results.

The primary object of the present invention is an electrical hygrometer which is simple and rugged in construction, relatively sensitive and yet capable of being readily reproduced and of standard commercial use.

A further object of the invention is the provision of a hygrometer responsive to the electrical conductivity of a hygroscopic element formed of a gelatin film.

Still another object of the invention is the provision of an electrical film hygrometer in which the hygroscopic element comprises a gelatin film having an electrolyte incorporated therein and having a pH value of 6.0–10.0, inclusive.

A still further object of the invention is the provision of an electrical film hygrometer including a photographic film as the hygroscopic element.

Other and further objects of the invention will be apparent to those skilled in the art from the description which follows.

The aforementioned and other objects of the invention are embodied in an electrical film hygrometer having a hygroscopic element formed of a film of gelatin and which gelatin film may be impregnated with a hygroscopic electrolyte to render the electrical resistance thereof continuously responsive to changes in humidity. The hygroscopic electrolyte may be an alkali metal halide, an alkali metal hydroxide or the hygroscopic salts generally incorporated in a gelatino-silver halide emulsion for photography. The hygrometer also generally comprises a holder for the hygroscopic element, a direct current amplifier and a meter. Specifically, the holder for the hygroscopic film may include a pair of photographic films in back-to-back relation with their emulsion surfaces engaging contact surfaces of the holder.

Reference is hereby made to the accompanying drawings wherein like reference characters designate similar elements and wherein Fig. 1 is a chart showing the resistivity-relative humidity characteristics of two films according to the invention.

Fig. 2 is a side elevation of a holder for the hygroscopic element.

Fig. 3 is a side view of the preferred form of holder for the hygroscopic element.

Fig. 4 is a transverse section through the preferred form of element holder taken on the line 4—4 of Fig. 3.

Fig. 5 is a plan view of the hygroscopic element holder and includes a wiring diagram and diagrammatic illustration of the amplifier and meter also used.

The basic principle of the electrical film hygrometer according to the invention is founded upon a change in the resistance of a gelatin film with change in the humidity of the surrounding atmosphere. Such a hygrometer may be used under circumstances where wet bulb hygrometry is prohibited, for instance, in small humidifier jars. The gelatin film is very sensitive to moisture which causes its resistance to change over several orders when the humidity varies between 0 and 100%. Furthermore, the response or changes in resistance of the gelatin film with changes in humidity is very rapid. The sensitivity of the hygrometer may also be varied or controlled by including or incorporating into the gelatin film various amounts of hygroscopic electrolytes, such as alkali metal halides or alkali metal hydroxides. Curve A of Fig. 1 represents the log resistivity and relative humidity for a gelatin film without any hygroscopic electrolyte or other hygroscopically sensitive conducting substances. Curve B represents the resistivity-relative humidity characteristic of a gelatin film impregnated with a hygroscopic electrolyte to reduce the resistivity of the film and thereby reducing the required gain of the amplifier and sensitivity of the meter for reading the changes in conductivity of the film. Specifically, the gelatin film producing curve B was impregnated with 8% salt.

The gelatin film for the electrical hygrometer according to the invention is preferably made of a de-ashed gel having a pH value adjusted between 6.0 and 10.0. Such a film will possess suitable resistivity-humidity characteristics for hydrometric purposes. The adjustment of the pH value of the de-ashed gel may be accomplished in any of several ways such as the addition of alkali metal halides, specifically potassium chloride or potassium bromide or by the addition of alkali metal hydroxides such as sodium hydroxide or potassium hydroxide. Also, a common gelatino-silver halide photographic emulsion includes hygroscopic electrolytes or salts of similar effect to those already mentioned so that an ordinary photographic film may be used as the hygroscopic element of the hygrometer according to the invention. The electrolytes or conducting agents are introduced into the gelatin film mainly for the purpose of lowering the overall resistance level of the hygroscopic element and to reduce its resistivity to a more convenient working range. Alternatively, or simultaneously the resistance level of the hygroscopic element may be reduced by increasing the thickness of the film. However, the film preferably should not exceed 0.0002 inch in thickness in order that the resistivity response to humidity changes may be rapid. The lower resistance levels obtained in the manner just described are desirable from the standpoint of simplification of amplifier design and electrode shielding, particularly for plant installations.

It will be noted from the characteristic curves of Fig. 1 that either the thin gelatin film or the gelatin film including a hygroscopic electrolyte produces a response or change in resistivity which is directly proportional to changes in humidity values or relative humidity. Also, such characteristic response is such that the increments of resistivity with changes in relative humidity are such that they can be readily ascertained by well known equipment such as an amplifier and meter. This change of resistivity with change in humidity is described as continuous hereinafter and in the claims.

The resistivity-humidity response of the gelatin hygroscopic elements according to the invention is improved by pre-aging of the element. The amplifier circuit is modified to give a response corresponding to such characteristic. There may be a small temperature effect on the resistance of the gelatin film which for most accurate results necessitates separate calibration curves for different temperature levels.

In the illustrated embodiment two forms of holder for the hygroscopic element are shown. The holder shown in Fig. 2 comprises a base 10, a pair of cylindrical insulating supports 11 mounted thereon and a pair of contact supports 12 affixed to the tops of supports 11. Contact clamps 13 are hinged at 14 to contact supports 12 and are tightened thereagainst by thumb screws 15. The hygroscopic element 16 has its ends or edges fastened between supports 12 and clamps 13 which are connected in any known or suitable manner to instruments for recording the resistance or change in resistance of the hygroscopic element 16 according to the humidity of the atmosphere surrounding the same.

The preferred form of holder for the hygroscopic element is illustrated in Figs. 3, 4 and 5. Such holder comprises a pair of contact bars 17 and a pair of contact bars 18 having their ends inserted into a recess in an insulating base 19. A photographic film F has a flexible support 21 and a gelatino-silver halide emulsion 20. A second photographic film F₁ has a flexible support 22 and a gelatino-silver halide emulsion 23, see Fig. 4. A resilient layer 24 is interposed between the supports 21 and 22 of the films F and F₁ which are in back-to-back relation. Such resilient layer 24 is conveniently composed of a thin piece of gasket rubber. A plurality of screws 25 extend between the pairs of contact bars 17 and 18, being threaded into one of each pair. Obviously, tightening of said screws 25 presses the contact bars 17 toward each other and also moves the contact bars 18 together. As a result, the contact bars 17 and 18 are pressed into good electrical contact with the emulsions 20 and 23 on the films F and F₁ and the resilient layer 24 reacts upon said films to hold their emulsions in good contact with the bars 17 and 18.

A plurality of screws 26 extend through insulating base 19 to hold the end of the hygroscopic assembly therein. Terminal screws 27 and 28 extend through insulating base 19 and into and through the respective conductor bars 17 and 18. A wire 29 has one end connected to terminal screw 27, preferably extends through a hole 30 provided in base 19 and is connected to one side of a battery 31. The other side of battery 31 is connected by a wire 32 to the amplifier terminal 33. A wire 34 has one end connected to terminal screw 28, extends through a bore 35 in base 19 and is connected to the amplifier terminal 36.

The amplifier 37 may be of any known or standard form and is preferably a two-stage degenerative D. C. amplifier. Since such amplifiers are well known, it has not been deemed necessary to illustrate the amplifier details except to show input resistors 38 and 39 alternatively connected across the input circuit by switch 40. By selection of appropriate input resistors in the amplifier two different levels of humidity may be covered. The output from the amplifier is connected by wires 41 and 42 to a meter 43. Such meter 43 may be a sensitive milliammeter of range 0–1.0 milliampere and is preferably of the recording type. Alternatively, the voltage supply for the hygroscopic film element may be alternating current which has the advantage of preventing polarization and the change in resistance in the hygroscopic element measured by an A. C. vacuum tube voltmeter. This alternative is illustrated in Fig. 2. The alternating current supply main 44 is connected to the contact support 12 and the alternating current supply main 45 is connected to one terminal of the A. C. vacuum tube voltmeter 46. A wire 47 extends from the other terminal of the vacuum tube voltmeter 46 to the other contact support 12.

Since the electrical hygrometer including a hygroscopic element of gelatin film or gelatin film including a hygroscopic electrolyte is susceptible of the variations indicated and equivalents thereof, the present disclosure is to be construed in an illustrative sense. The scope of the invention is defined by the claims which follow.

Having now particularly described my invention, what I desire to secure by Letters Patent of the United States and what I claim is:

1. A humidity responsive device comprising a pair of resistance elements each composed of a flexible sheet support coated on one side with a thin film of gelatin and placed in support-to-support relation, and a pair of electrode members each including a pair of contact bars engaging opposed surfaces of the respective gelatin films and each pair of contact bars being spaced from the other pair of contact bars to engage spaced surface portions of respective gelatin films.

2. A humidity responsive device comprising a layer of resilient material, a pair of resistance elements each composed of a flexible sheet support coated on one side with a thin film of gelatin and each placed on opposite sides of said layer of resilient material with said supports in surface contact therewith, and a pair of electrode members each including a pair of contact bars engaging opposed surfaces of the respective gelatin films and holding said supports in surface contact with said resilient layer, each pair of contact bars being spaced from the other pair of contact bars to engage spaced surface portions of respective gelatin films.

3. In a device for determining the humidity of an atmosphere by electrical measurement, a humidity responsive element which varies in electrical conductivity with variations in humidity, said humidity responsive element being composed of a film of gelatin.

4. A humidity responsive element for use in an electrical humidity measuring device, comprising a film of gelatin varying in electrical conductivity with variations in humidity of the surrounding atmosphere.

5. A humidity responsive element for use in an electrical humidity measuring device, comprising a film of pre-aged gelatin varying in electrical conductivity with variations in humidity of the surrounding atmosphere and fixed in a plane.

6. A humidity responsive element for use in an electrical humidity measuring device, comprising a film of gelatin having an electrolyte incorporated therein and varying in electrical conductivity with variations in humidity of the surrounding atmosphere.

7. A humidity responsive element for use in an electrical humidity measuring device, comprising a film of gelatin including a hygroscopic electrolyte and having a pH value of 6.0–10.0, inclusive, and varying in electrical conductivity with variations in humidity of the surrounding atmosphere.

8. A humidity responsive element for use in an electrical humidity measuring device, comprising a film of gelatin fixed in a plane and including an alkali metal halide.

9. A humidity responsive element for use in an electrical humidity measuring device, comprising a film of gelatin including an alkali metal hydroxide.

10. A humidity responsive element for use in an electrical humidity measuring device, comprising a photographic film fixed in a plane and having a gelatino-silver halide emulsion.

HARRY W. CLEVELAND.

REFERENCES CITED

The following references are of record in the file of this patent:

UNITED STATES PATENTS

| Number | Name | Date |
| --- | --- | --- |
| 1,293,527 | Ovington | Feb. 4, 1919 |
| 1,749,826 | Lubach | Mar. 11, 1930 |
| 2,047,638 | Kott | July 14, 1936 |
| 2,064,651 | Fiene | Dec. 15, 1936 |
| 2,175,893 | Hill | Oct. 10, 1939 |
| 2,234,858 | Brown et al. | Mar. 11, 1941 |
| 2,237,006 | Koller | Apr. 1, 1941 |
| 2,255,734 | McGrath | Sept. 9, 1941 |
| 2,285,421 | Dunmore | June 9, 1942 |
| 2,358,406 | Lichtgarn | Sept. 19, 1944 |